US012747625B2

(12) United States Patent
Miki

(10) Patent No.: US 12,747,625 B2
(45) Date of Patent: Sep. 29, 2026

(54) DOUBLE-PANE GLASS PANEL

(71) Applicant: NIPPON SHEET GLASS COMPANY, LIMITED, Tokyo (JP)

(72) Inventor: Atsushi Miki, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 135 days.

(21) Appl. No.: 18/708,168

(22) PCT Filed: Feb. 6, 2023

(86) PCT No.: PCT/JP2023/003684

§ 371 (c)(1),
(2) Date: May 7, 2024

(87) PCT Pub. No.: WO2023/157686

PCT Pub. Date: Aug. 24, 2023

(65) Prior Publication Data

US 2024/0426168 A1 Dec. 26, 2024

(30) Foreign Application Priority Data

Feb. 16, 2022 (JP) ................................ 2022-022228

(51) Int. Cl.
*E06B 3/663* (2006.01)

(52) U.S. Cl.
CPC ................................ *E06B 3/66342* (2013.01)

(58) Field of Classification Search
CPC .................................................. E06B 3/66342
USPC ........................................................... 428/34
See application file for complete search history.

(56) References Cited

U.S. PATENT DOCUMENTS

| | | | | |
|---|---|---|---|---|
| 2005/0104032 | A1 | 5/2005 | Cho et al. | |
| 2005/0238803 | A1 | 10/2005 | Tremel et al. | |
| 2017/0274353 | A1 | 9/2017 | Ishibashi et al. | |
| 2020/0131841 | A1* | 4/2020 | Abe | E06B 3/6612 |
| 2020/0181013 | A1 | 6/2020 | Ishibashi et al. | |

FOREIGN PATENT DOCUMENTS

| | | | |
|---|---|---|---|
| CN | 103043921 | A | 4/2013 |
| JP | 2007511102 | A | 4/2007 |
| WO | 2016051788 | A1 | 4/2016 |
| WO | 2019003997 | A1 | 1/2019 |
| WO | 2019004174 | A1 | 1/2019 |

* cited by examiner

*Primary Examiner* — Tahseen Khan
(74) *Attorney, Agent, or Firm* — SZDC Law PC

(57) ABSTRACT

A double-pane glass panel includes: a pair of glass plates facing each other; a peripheral sealing material provided over whole outer edges of the pair of glass plates to form a gap sealed between the pair of glass plates; a plurality of spacing members disposed in the gap; and a gas adsorption material disposed on one surface out of a pair of plate surfaces facing each other via the gap between the pair of glass plates, the gas adsorption material being apart from the other surface out of the pair of plate surfaces. The gas adsorption material includes a zeolite-based nonmetal getter material having a porous structure, and an inorganic binder material connecting the nonmetal getter material.

14 Claims, 6 Drawing Sheets

DOUBLE-PANE GLASS PANEL

This application is the National Stage Application of PCT/JP2023/003684, filed on Feb. 6, 2023, which claims priority to Japanese Patent Application No. 2022-022228, filed on Feb. 16, 2022, which is incorporated by reference for all purposes as if fully set forth herein.

TECHNICAL FIELD

The present invention relates to a double-pane glass panel.

BACKGROUND ART

Patent Literature 1 discloses a manufacturing method of a double-pane glass panel having a decompressed space formed between a pair of glass plates. The double-pane glass panel includes a gas adsorption material for adsorbing gas released from a frame body or the like into the decompressed space. Gas remaining in the decompressed space is adsorbed by the gas adsorption material, so that a heat transmission coefficient (U-value) of the decompressed space is further reduced, thereby making it possible to improve heat insulating properties of the double-pane glass panel.

In the double-pane glass panel of Patent Literature 1, the gas adsorption material is made of a getter material (zeolite). The getter material is heated to be activated during manufacture or the like of the double-pane glass panel, so that the getter material adsorbs gas released from a frame body or the like. However, the getter material is not usable when the getter material cannot be heated up to its activation temperature or more. Accordingly, in the manufacturing method of the double-pane glass panel described in Patent Literature 1, the getter material is covered with a packaging material containing powder, so that the getter material wrapped by the packaging material is heated to be activate in an activation step, and the getter material is sealed by the package material with the power being melted in a sealing step. In the sealing step, the getter material is heated at a temperature higher than a heating temperature in the activation step, so that the getter material is sealed in an activated state, and the activated state of the getter material is maintained.

CITATION LIST

Patent Literature

Patent Literature 1: WO 2019/003997

SUMMARY OF INVENTION

Technical Problem

However, in the double-pane glass panel of Patent Literature 1, since the getter material as the gas adsorption material is covered with the packaging material, gas adsorption performance by the getter material might decrease under the influence of the packaging material. Also, in a case where the gas adsorption material is in contact with both of the pair of glass plates, the gas adsorption material is prevented from coming into contact with gas in respective contact portions with the glass plates, so that the contact area of the gas adsorption material with gas decreases. This also decreases the gas adsorption performance of the gas adsorption material.

In view of this, a double-pane glass panel that can stably secure the gas adsorption performance of a gas adsorption material with a simple configuration is desired.

Solution to Problem

A double-pane glass panel according to the present invention has a feature configuration in that: the double-pane glass includes a pair of glass plates facing each other, a peripheral sealing material provided over whole outer edges of the pair of glass plates to form a gap sealed between the pair of glass plates, a plurality of spacing members disposed in the gap, and a gas adsorption material disposed on one surface out of a pair of plate surfaces facing each other via the gap between the pair of glass plates, the gas adsorption material being apart from the other surface out of the pair of plate surfaces; and the gas adsorption material includes a zeolite-based nonmetal getter material having a porous structure, and an inorganic binder material connecting the nonmetal getter material.

Generally, the gas adsorption material is formed by pulverizing a zeolite-based nonmetal getter material. In this configuration, since the gas adsorption material includes a zeolite-based nonmetal getter material having a porous structure, and an inorganic binder material connecting the nonmetal getter material, the powdered nonmetal getter material in the gas adsorption material is stably held by the inorganic binder material. Hereby, the gas adsorption material does not need to cover the nonmetal getter material with a packaging material unlike the double-pane glass panel in Patent Literature 1, so that the double-pane glass panel can stably secure the gas adsorption performance of the gas adsorption material with a simple configuration.

If the binder material included in the gas adsorption material is constituted by an organic material, gas is generated from the organic material at the time when the gas adsorption material is heated to its activation temperature. Accordingly, gas might remain in the gap in the double-pane glass panel to decrease the heat insulation performance. In the meantime, in this configuration, since the gas adsorption material includes the inorganic binder material, no gas is generated from the inorganic binder material even when the gas adsorption material is heated to its activation temperature. This makes it possible to maintain the heat insulation performance of the double-pane glass panel.

In this configuration, the gas adsorption material is disposed on the one surface out of the pair of plate surfaces facing each other via the gap between the pair of glass plates such that the gas adsorption material is apart from the other surface out of the pair of plate surfaces. Accordingly, the gas adsorption material can secure a large contact area with gas without decreasing the contact area with gas by the other surface between the glass plates. As a result, the double-pane glass panel can stably secure the gas adsorption performance of the gas adsorption material with a simple configuration.

Another feature configuration is such that: the double-pane glass panel further includes a suction hole sealing material sealing a suction hole formed from a front side to a back side of either one of the glass plates, in such a manner as to decompress the gap via the suction hole; and the gas adsorption material and the spacing members are disposed at different positions as viewed vertically to the plate surfaces.

In this configuration, the double-pane glass panel is a decompressed double-pane glass panel in which the gap is decompressed, and the gas adsorption material is disposed at a position different from the spacing members as viewed vertically to the plate surfaces of the glass plates. Hereby, the gas adsorption material is disposed at a right position different from the spacing members in the decompressed gap to secure its surface area. As a result, the decompressed double-pane glass panel can also stably secure the gas adsorption performance of the gas adsorption material with a simple configuration.

Another feature configuration is such that the gas adsorption material is disposed between the peripheral sealing material and the spacing members.

When the gas adsorption material is disposed between the peripheral sealing material and the spacing members like this configuration, the gas adsorption material can be disposed near the peripheral edge of the double-pane glass panel. Hereby, it is possible to restrain the influence of the gas adsorption material on the appearance of the double-pane glass panel. In a case where the gas adsorption material is disposed between a plurality of spacing members adjacent to each other, it is necessary to increase the distance between the plurality of spacing members adjacent to each other to correspond to the dimension of the gas adsorption material, and this might decrease the holding strength of the pair of glass plates in the double-pane glass panel. On the other hand, when the gas adsorption material is disposed between the peripheral sealing material and the spacing members like this configuration, the distance between the plurality of spacing members adjacent to each other can be set uniform by a predetermined pitch, so that the double-pane glass panel can easily maintain the holding strength of the pair of glass plates between the plurality of spacing members. Hereby, it is possible to restrain a decrease in the holding strength of the pair of glass plates in the double-pane glass panel.

Another feature configuration is such that the gas adsorption material is disposed between spacing members adjacent to each other among the plurality of spacing members.

In the double-pane glass panel including a plurality of spacing members, in a case where the distance between the peripheral sealing material and a spacing member adjacent to the peripheral sealing material is smaller than the width of the gas adsorption material, no gas adsorption material can be disposed therebetween. In such a case, when the gas adsorption material is disposed between the spacing members adjacent to each other like this configuration, the gas adsorption material can be surely disposed in the double-pane glass panel. When the gas adsorption material is disposed between a spacing member adjacent to the peripheral sealing material and a spacing member adjacent to the above spacing member, for example, the gas adsorption material can be disposed near the peripheral edges of the pair of glass plates. Hereby, it is possible to restrain the influence of the gas adsorption material on the appearance of the double-pane glass panel.

Another feature configuration is such that the gas adsorption material is disposed such that a distance from the peripheral sealing material to the spacing members is 40 mm or less, and a distance from the gas adsorption material to the peripheral sealing material and a distance from the gas adsorption material to the spacing members are 1 mm or more.

In the double-pane glass panel, when the distance between the peripheral sealing material and the spacing member is too large, the holding strength of the pair of glass plate decreases. In view of this, in this configuration, the distance between the peripheral sealing material and the spacing member between which the gas adsorption material is disposed is 40 mm or less. Hereby, it is possible to restrain the decrease in the holding strength of the pair of glass plates in the double-pane glass panel. Further, in this configuration, the distance between the gas adsorption material and the peripheral sealing material and the distance between the gas adsorption material and the spacing member are both 1 mm or more, and therefore, the gas adsorption material can be disposed apart from the peripheral sealing material and the spacing member. This allows the gas adsorption material to secure a large contact area with gas on the surface thereof. As a result, the double-pane glass panel can stably secure the gas adsorption performance of the gas adsorption material.

Another feature configuration is such that the gas adsorption material is disposed such that a distance between the spacing members adjacent to each other is 40 mm or less, and a distance from the gas adsorption material to each of the spacing members adjacent to each other is 1 mm or more.

In the double-pane glass panel, when the distance between the spacing members adjacent to each other is too large, the holding strength of the pair of glass plates in the double-pane glass panel decreases. In view of this, in this configuration, the distance between the spacing members adjacent to each other is 40 mm or less. Hereby, it is possible to restrain the decrease in the holding strength of the pair of glass plates in the double-pane glass panel. In the meantime, in this configuration, the distance from the gas adsorption material to each of the spacing members adjacent to each other is 1 mm or more, and therefore, the gas adsorption material can be disposed apart from the spacing members adjacent to each other. This allows the gas adsorption material to secure a large contact area with gas on the surface thereof. As a result, the double-pane glass panel can stably secure the gas adsorption performance of the gas adsorption material.

Another feature configuration is such that: the gas adsorption material is disposed in a linear shape along the plate surface as the one surface; and the gas adsorption material is 1 mm or more but 15 mm or less in width, is 1 mm or more but 2000 mm or less in length, and is 10 μm or more but 190 μm or less in height relative to the plate surface.

In this configuration, the gas adsorption material is disposed in a linear shape along the plate surface as the one surface between the glass plates, and the width and the length of the gas adsorption material are within respective predetermined ranges. Accordingly, the gas adsorption material of the double-pane glass panel can sufficiently exercise the gas adsorption performance and can restrain the influence on the appearance. When the width of the gas adsorption material is less than 1 mm, the gas adsorption material cannot sufficiently exercise the gas adsorption performance, but when the width exceeds 15 mm, the gas adsorption material is excessively outstanding and impairs the appearance of the double-pane glass panel. In addition, when the length of the gas adsorption material is less than 1 mm, the gas adsorption material cannot sufficiently exercise the gas adsorption performance, but when the length exceeds 2000 mm, the gas adsorption material is excessively outstanding and impairs the appearance of the double-pane glass panel. Further, in this configuration, the gas adsorption material is 10 μm or more but 190 μm or less in height relative to the plate surface. Hereby, the gas adsorption material of the double-pane glass panel can sufficiently exercise the gas adsorption performance and is hard to come into contact with the other surface between the glass plates, thereby making it possible to avoid such a situation that its corresponding glass plate is damaged due to contact with the high-hardness gas adsorption material. In the meantime, when the height of the gas adsorption material is less than 10 μm, the gas adsorption material cannot sufficiently exercise the gas adsorption performance, but when the height is more than 190 μm, the gas adsorption material easily comes into contact with the other surface between the glass plates at the time when an impact or the like is applied to the glass plates. When the gas adsorption material comes into contact with the other surface between the glass plates, its corresponding glass plate might be damaged by the high-hardness gas adsorption material. When the height of the gas adsorption material exceeds 190 μm and the gas adsorption material comes into contact with both surfaces of the pair of glass plates, the gas adsorption material causes heat transfer between the pair of glass plates, so that the heat insulation performance of the double-pane glass panel decreases.

Another feature configuration is such that the inorganic binder material is made of a material having gas adsorption performance.

When the inorganic binder material included in the gas adsorption material is made of a material having gas adsorption performance like this configuration, gas absorption by the gas adsorption material in the gap is further promoted by the inorganic binder material in the double-pane glass panel. This decreases the thermal transmittance (U-value) of the gap in the double-pane glass panel, thereby making it possible to further improve heat insulating properties.

Another feature configuration is such that the gas adsorption material is disposed in a single continuous region on the one surface.

If the gas adsorption material is disposed in a plurality of regions on the one surface between the glass plates, the presence of the gas adsorption material in the plurality of regions might have a large influence on the appearance of the double-pane glass panel. Further, in a case where the distance between the peripheral sealing material and the spacing member or the distance between a plurality of spacing members adjacent to each other is made large to dispose the gas adsorption material, the holding strength of the pair of glass plates in a corresponding portion decreases. In view of this, in this configuration, the gas adsorption material is disposed in a single continuous region on the one surface between the glass plates. This makes it possible to restrain the influence of the gas adsorption material on the appearance of the double-pane glass panel and to restrain a decrease in the holding strength of the pair of glass plates.

Another feature configuration is such that: the pair of glass plates are formed into a rectangular shape having a long-side portion and a short-side portion; and the gas adsorption material is disposed in the short-side portion.

In a case where the pair of glass plates are formed into a rectangular shape having a long-side portion and a short-side portion, when the gas adsorption material is disposed in the long-side portion or the short-side portion, it is possible to restrain the influence on the appearance of the double-pane glass panel. In this configuration, the gas adsorption material is disposed in the short-side portion, and therefore, it is possible to shorten the length of the gas adsorption material disposed in the pair of glass plates. As a result, it is possible to further restrain the influence of the gas adsorption material on the appearance of the double-pane glass panel.

Another feature configuration is such that the inorganic binder material contains a dispersing agent.

Since the gas adsorption material includes the inorganic binder material, the powdered nonmetal getter material in the gas adsorption material is stably held by the inorganic binder material. Such a gas adsorption material is disposed such that the gas adsorption material is mixed with water and applied to the plate surface between the glass plates, for example. In this case, it is necessary that the gas adsorption material be dispersed in water. However, since the nonmetal getter material constituting the gas adsorption material is hard to be mixed with water, the gas adsorption material applied to the plate surface between the glass plates is hard to have sufficient gas adsorption performance. In view of this, in this configuration, the inorganic binder material included in the gas adsorption material contains a dispersing agent. Hereby, the dispersing agent causes the nonmetal getter material in the gas adsorption material to be easily mixed with water, so that the gas adsorption material applied to the plate surface between the glass plates easily secure sufficient gas adsorption performance.

Another feature configuration is such that: the gas adsorption material further includes a metal getter material; and the metal getter material and the nonmetal getter material are disposed at different positions as viewed vertically relative to the plate surface.

In this configuration, the gas adsorption material further includes the metal getter material in addition to the nonmetal getter material, and the metal getter material is disposed at a position different from the nonmetal getter material. Accordingly, the gas adsorption material can also adsorb gas by the metal getter material. More specifically, the nonmetal getter material and the metal getter material have different actions such that the nonmetal getter material adsorbs gas by physical adsorption in the short term, whereas the metal getter material adsorbs gas by chemical adsorption in the long term. Since the gas adsorption material includes the nonmetal getter material and the metal getter material that are different in time to exercise gas adsorption performance, the gas adsorption material can further improve the gas adsorption performance. Note that the metal getter material and the nonmetal getter material may be disposed on the one surface, or the nonmetal getter material may be disposed on the one surface and the metal getter material may be disposed on the other surface, provided that the metal getter material and the nonmetal getter material are provided at different positions as viewed vertically to the plate surfaces.

Another feature configuration is such that the metal getter material is an evaporable metal getter material.

In a case where the metal getter material is an evaporable metal getter material like this configuration, when the metal getter material is heated and activated, the metal getter material partially evaporates to detach adsorbed molecules, so that the adsorbed molecules disperse in the gap. This allows the gas adsorption material to effectively adsorb gas in the gap by the adsorbed molecules. As a result, it is possible to further improve the gas adsorption performance of the gas adsorption material in the double-pane glass panel.

Another feature configuration is such that: the evaporable metal getter material is made of alloy containing barium and aluminum; and the peripheral sealing material is a glass frit.

In a case where the evaporable metal getter material constituting the gas adsorption material is constituted by alloy containing barium and aluminum like this configuration, barium sublimates in response to activation of the evaporable metal getter material due to heating. Hereby, adsorbed molecules dispersed in the gap due to the sublimation of barium in the gas adsorption material adsorb gas, so that the gas adsorption performance of the gas adsorption material can be surely improved in the double-pane glass panel.

Here, it is necessary to heat the evaporable metal getter material at a high temperature of 800° C. or more to activate the alloy containing barium and aluminum as the evaporable metal getter material. In order to restrain the influence on the appearance of the double-pane glass panel, it is preferable to dispose the gas adsorption material (the evaporable metal getter material) near the peripheral sealing material. Note that, in a case where the melting point of the peripheral sealing material is low, when the alloy containing barium and aluminum as the evaporable metal getter material is heated, the peripheral sealing material might melt, and therefore, the gas adsorption material (the evaporable metal getter material) cannot be disposed near the peripheral sealing material. In view of this, in this configuration, the peripheral sealing material is a glass frit. The glass frit is a vitreous inorganic matter, its softening point can be set with a range from 300° C. to 950° C., and its composition can be selected depending on the purpose of use. Accordingly, even when the alloy containing barium and aluminum as the evaporable metal getter material is heated to be activated, the peripheral sealing material is hard to be melted. On this account, in this configuration, the alloy containing barium and aluminum as the gas adsorption material (the evaporable metal getter material) can be disposed near the peripheral sealing material that has a little influence on the appearance of the double-pane glass panel.

DESCRIPTION OF EMBODIMENTS

The following describes embodiments of a double-pane glass panel according to the present invention with reference the drawings. The present embodiment deals with a vacuum double-pane glass panel as an example of the double-pane glass panel. However, the present invention is not limited to the following embodiments and can be variously modified without departing from the gist of the present invention.

First Embodiment

Figure 1:
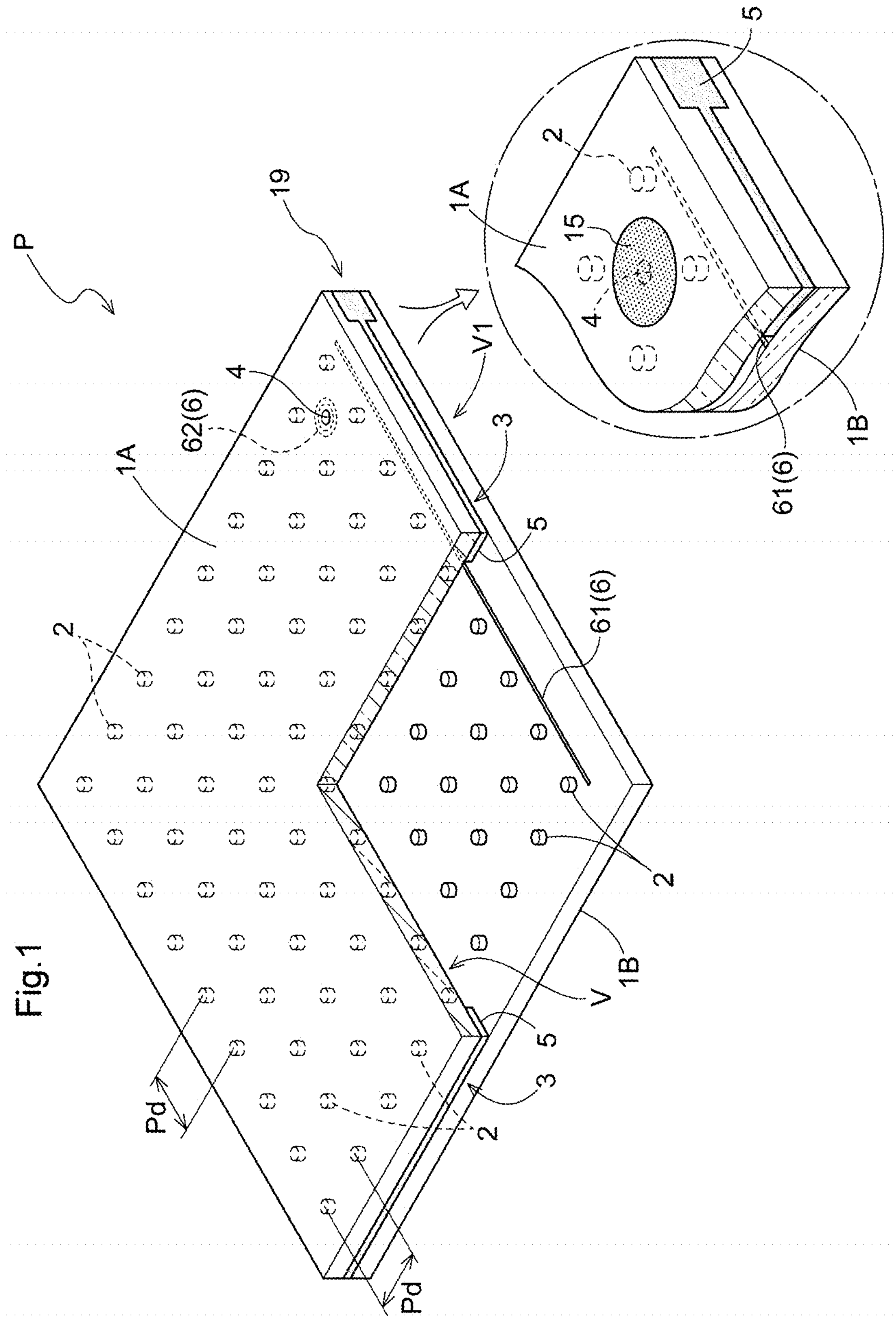
FIG. 1 is a partially cutaway perspective diagram of a double-pane glass panel in a first embodiment.
Figure 2:
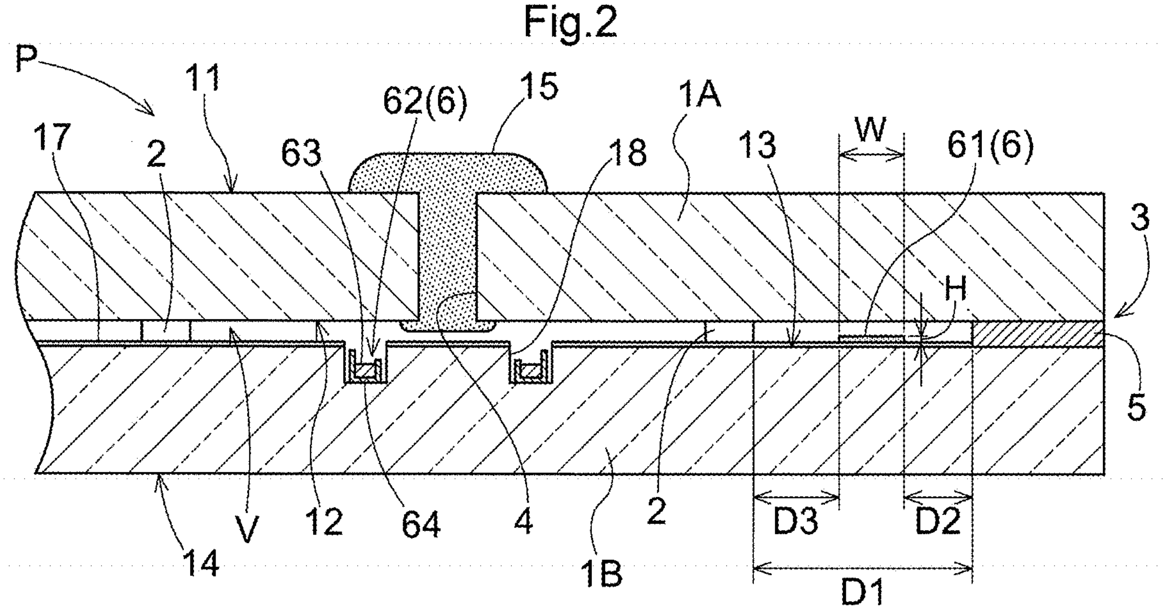
FIG. 2 is a drawing of longitudinal section around a suction hole of the double-pane glass panel in the first embodiment.

As illustrated in FIGS. 1, 2, a double-pane glass panel (hereinafter referred to as a "glass panel") P includes a pair of glass plates 1A, 1B facing each other, a peripheral sealing material 5, a suction hole sealing material 15, a plurality of spacers 2 (an example of spacing members), and a gas adsorption material 6. The peripheral sealing material 5 is provided on whole outer edges 3 of the pair of glass plates 1A, 1B to form a gap V sealed between the pair of glass plates 1A, 1B. The plurality of spacers 2 is disposed in the gap V. The pair of glass plates 1A, 1B are constituted by a first glass plate 1A and a second glass plate 1B.

Here, the first glass plate 1A has two plate surfaces such that a plate surface that does not face the second glass plate 1B is defined as a first surface 11, and a plate surface that faces the second glass plate 1B is defined as a second surface 12, and the second glass plate 1B has two plate surfaces such that a plate surface facing the second surface 12 is defined as a third surface 13, and a plate surface that does not facing the second surface 12 is defined as a fourth surface 14.

The first glass plate 1A has a suction hole 4 that is open on both front and back sides. The suction hole 4 is sealed with the suction hole sealing material 15 covering the suction hole 4 and its peripheral edge. The suction hole sealing material 15 is provided on either of the pair of glass plates 1A, 1B to seal the suction hole 4 with the gap V being decompressed via the suction hole 4.

In the glass panel P, the pair of glass plates 1A, 1B are transparent float glass, for example. The pair of glass plates 1A, 1B are not limited to this. As the pair of glass plates 1A, 1B, various types of glass can be selected and used appropriately depending on the purpose of use described above. The various types of glass include, for example, figured glass, ground glass having a light diffusion function by a surface treatment, wire-reinforced glass, wired glass plate, tempered glass, double tempered glass, low reflection glass, high-transmission glass plate, ceramic glass plate, special glass having a heat-ray or ultraviolet absorption function, a combination thereof, or the like. As for the composition of the pair of glass plates 1A, 1B, soda silicate glass, soda-lime glass, borosilicate glass, aluminosilicate glass, various types of crystallized glass, or the like can be used.

The gap V formed between the pair of glass plates 1A, 1B is decompressed to be equal to or less than 1.33 Pa ($1.0\times10^{-2}$ Torr), for example. The gap Vis decompressed by discharging air in the gap V to outside through the suction hole 4, and the gap V is sealed by the peripheral sealing material 5 and the suction hole sealing material 15 to maintain a decompressed state thereof. The glass panel P may be configured such that the pressure of the gap V is decreased until the gap V becomes almost evacuated or may be configured such that the pressure of the gap V is not decreased.

The spacer 2 has a columnar shape with a diameter of 0.3 mm or more but 1.0 mm or less and a height of 30 μm or more but 1.0 mm or less. The spacer 2 is made of a material that does not buckle even when the material receives a compressive stress caused due to an atmospheric pressure acting on the glass plates 1A, 1B, e.g., a material having a compressive strength equal to or more than 4.9×108 Pa (5×103 kgf/$cm^2$), preferably, stainless steel (SUS304) or the like.

However, the spacer 2 is not limited to stainless steel and may be made of, for example, metal such as Inconel, iron, aluminum, tungsten, nickel, chrome, or titanium, alloy such as carbon steel, chrome steel, nickel steel, nickel-chrome steel, manganese steel, chromic manganese steel, chrome molybdenum steel, silicon steel, brass, solder, or duralumin, or a high-rigidity material such as ceramic or glass. The spacer 2 is not limited to a columnar shape and may have various shapes such as a square shape or a spherical shape.

The second glass plate 1B includes a Low-E film 17 formed on the third surface 13. The Low-E film 17 includes a low radiation layer mainly containing silver, for example.

The peripheral sealing material 5 and the suction hole sealing material 15 are formed by use of a glass frit or solder having a melting temperature of 250° C. or less, e.g., solder having a composition of 91.2Sn-8.8Zn (eutectic point temperature: 198° C.). The peripheral sealing material 5 is not limited to this, and the outer peripheral edges of the pair of glass plates 1A, 1B may be sealed by a sealing material that is a metal material containing at least one material selected from a group consisting of Sn, Cu, In, Bi, Zn, Pb, Sb, Ga, and Ag and having a melting temperature of 250° C. or less, or a sealing material made of resin that solidifies at a room temperature.

Further, the metal material may contain at least one material selected from a group consisting of Ti, Al, and Cr. Hereby, adhesiveness between the peripheral sealing material 5 and the glass component of the pair of glass plates 1A, 1B can be improved.

The gas adsorption material 6 is disposed on the third surface 13 of the second glass plate 1B. The gas adsorption material 6 is constituted by a first gas adsorption material 61 containing a nonmetal getter material, and a second gas adsorption material 62 containing a metal getter material 63. The first gas adsorption material 61 further contains an inorganic binder material in addition to the nonmetal getter material.

The nonmetal getter material of the first gas adsorption material 61 is a getter material made of nonmetal having a porous structure that can adsorb gas molecules and is a zeolite-based getter material, an activated carbon getter material, or a magnesium oxide getter material as an example. The zeolite-based getter material contains ion-exchanged zeolite. An ion exchange material is, for example, K, $NH_4$, Ba, Sr, Na, Ca, Fe, Al, Mg, Li, H, or Cu. Since the first gas adsorption material 61 contains a nonmetal getter material, the first gas adsorption material 61 can effectively adsorb gas molecules of hydrocarbon gas ($CH_4$, $C_2H_6$, or the like) or ammonia gas ($NH_3$) that is hard to be adsorbed by the metal getter materials 63.

The first gas adsorption material 61 is disposed by being applied to the third surface 13 of the second glass plate 1B, for example. More specifically, the first gas adsorption material 61 is disposed, for example, such that an inorganic binder material and water are added to a powdered nonmetal getter material to mix the nonmetal getter material in the water, and resultant paste is applied to a plate surface (the third surface 13) of the second glass plate 1B. Since the first gas adsorption material 61 contains the inorganic binder material, the first gas adsorption material 61 is maintained stably by the inorganic binder material mixed with the powdered nonmetal getter material. The inorganic binder material is, for example, alkali silicate (sodium silicate, potassium silicate, or the like), phosphate (sodium phosphate, aluminum phosphate, magnesium phosphate, or the like), clay minerals (kaolin, smectite, talc, or the like), or the like.

It is preferable that the inorganic binder material contained in the first gas adsorption material 61 be made of a material having gas adsorption performance. In addition to that, it is more preferable that the inorganic binder material contain a dispersing agent. The dispersing agent is, for example, smectite, bentonite, fumed silica, or the like as a thickener. In a sample, the blend ratio of zeolite as the nonmetal getter material, kaolin as the inorganic binder material, and water is adjusted appropriately to zeolite 10:kaolin 1:water 16 to 18 as a reference.

In a case where the first gas adsorption material 61 is formed in a paste form (or a liquid form), it is necessary that the nonmetal getter material contained in the first gas adsorption material 61 be dispersed in water. Here, since the powdered nonmetal getter material is hard to be mixed with water in the first gas adsorption material 61, the first gas adsorption material 61 applied to the plate surface (the third surface 13) of the second glass plate 1B is hard to have sufficient gas adsorption performance. In the meantime, when the inorganic binder material contained in the first gas adsorption material 61 contains a dispersing agent, the dispersing agent causes the nonmetal getter material to be easily mixed with water in the first gas adsorption material 61. Hereby, the nonmetal getter material is moderately dispersed in the pasty first gas adsorption material 61 applied to the plate surface (the third surface 13) of the second glass plate 1B, so that sufficient gas adsorption performance is easily secured. In a case where the first gas adsorption material 61 contains, for example, zeolite (a nonmetal getter material), kaolin (an inorganic binder material), and smectite (a dispersing agent), when the blend ratio of these materials and water is set to zeolite 10:kaolin 1:smectite 1:water 16 to 18, the first gas adsorption material 61 is applicable to the plate surface of the glass panel P.

Figure 3:
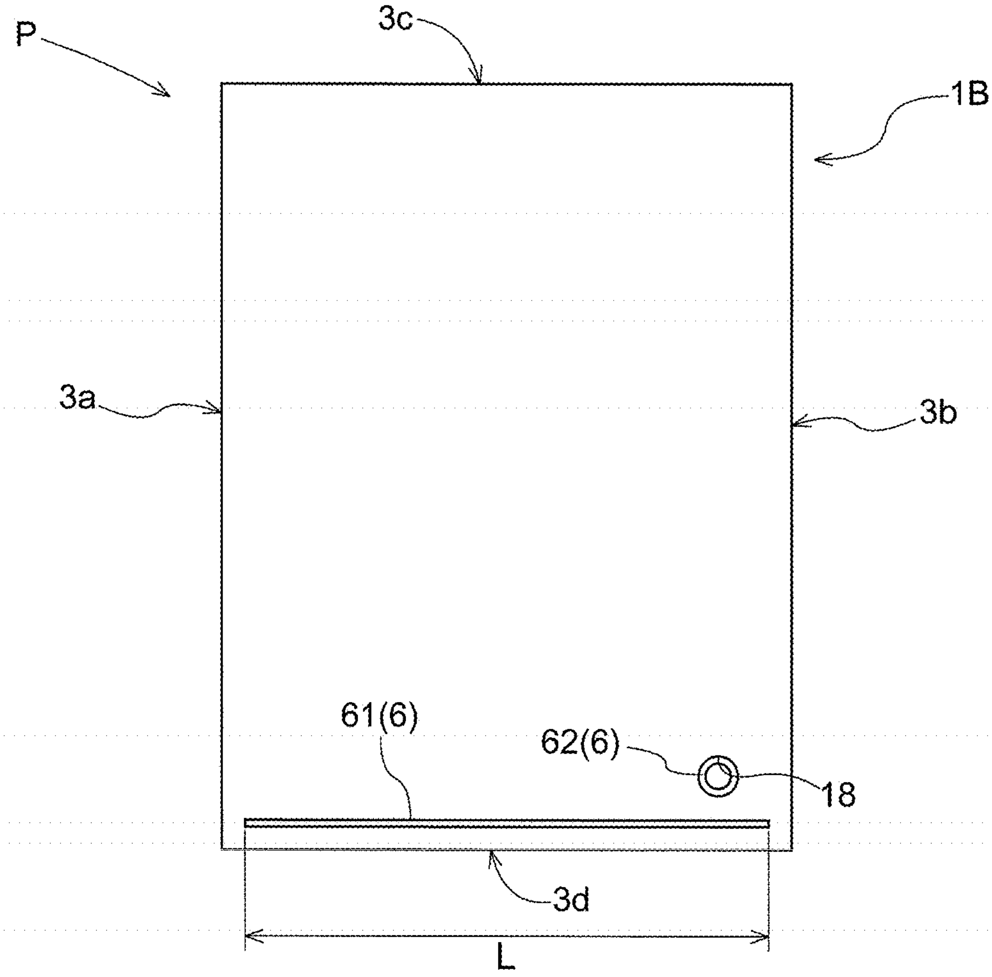
FIG. 3 is a plan view of the double-pane glass panel in the first embodiment.

The second gas adsorption material 62 is constituted by a circular container 64 having a groove containing the metal getter material 63. As illustrated in FIGS. 2 to 3, the third surface 13 of the second glass plate 1B has an annular storage hole 18 for storing the second gas adsorption material 62, and the second gas adsorption material 62 is disposed on the bottom surface of the storage hole 18. The storage hole 18 is formed in the second glass plate 1B, at a position facing the suction hole 4. The metal getter material 63 stored in the storage hole 18 is contained in the circular container 64 made of stainless steel, for example.

The metal getter material 63 of the second gas adsorption material 62 is a getter material made of metal having a metal surface that can chemically adsorb gas molecules. As the metal getter material 63, a zirconium-based getter material (Zr—Al, Zr—V—Fe, or the like) as a non-evaporable getter material, or metal such as Ti, Ba, or Mg or alloy such as BaAl or MgAl as an evaporable getter material is used. Since the second gas adsorption material 62 contains the metal getter material 63, the second gas adsorption material 62 can effectively adsorb gas molecules of $H_2O$, $N_2$, $O_2$, $H_2$, $CO_2$, or the like.

The evaporable metal getter material 63 is preferable as the metal getter material 63, and alloy containing barium and aluminum can be used, for example. When a predetermined amount of heat is applied to the evaporable metal getter material 63, the metal getter material 63 evaporates and adheres to the second surface 12 of the first glass plate 1A. The metal getter material 63 adhering to the second surface 12 adsorbs various gas molecules scattered in the gap V. The adsorption ability of the metal getter material 63 adhering to the second surface 12 is proportional to an area where the metal getter material 63 adheres to the second surface 12, and therefore, it is preferable that the evaporable metal getter material 63 adhere to a wide area of the second surface 12 in the glass panel P.

Thus, the first gas adsorption material 61 and the second gas adsorption material 62 are disposed apart from each other on the third surface 13 (an example of one surface) out of a pair of plate surfaces 12, 13 facing each other via the gap V in the pair of glass plates 1A, 1B, and the gas adsorption material 6 is apart from the second surface 12 (an example of the other surface) out of the pair of plate surfaces 12, 13.

The first gas adsorption material 61 is disposed in a single continuous region on the third surface 13 of the second glass plate 1B. Here, if the first gas adsorption material 61 is disposed in a plurality of regions on the third surface 13 of the second glass plate 1B, the presence of the first gas adsorption material 61 in the plurality of regions might have a large influence on the appearance of the glass panel P. Further, in a case where a distance D1 of a portion between the peripheral sealing material 5 and the spacer 2 is made large to dispose the first gas adsorption material 61, the holding strength of the pair of glass plates 1A, 1B in this portion decreases. When the first gas adsorption material 61 is disposed in a single continuous region on the third surface 13 of the second glass plate 1B like the present embodiment, it is possible to restrain the influence of the first gas adsorption material 61 on the appearance of the glass panel P and to restrain the decrease in the holding strength of the pair of glass plates 1A, 1B.

In a case where the second gas adsorption material 62 is made of the evaporable metal getter material 63 (for example, alloy containing barium and aluminum), barium sublimates in response to activation of the evaporable metal getter material 63 due to heating. Hereby, adsorbed molecules dispersed in the gap V due to the sublimation of barium adsorb gas, so that the second gas adsorption material 62 can surely improve the gas adsorption performance of the gas adsorption material 6 in the glass panel P. Here, in order to activate the alloy containing barium and aluminum as the evaporable metal getter material 63, it is necessary to heat the evaporable metal getter material 63 at a high temperature of 800° C. or more. In order to restrain the influence on the appearance of the glass panel P, it is preferable to dispose the second gas adsorption material 62 (the evaporable metal getter material 63) near the peripheral sealing material 5. Note that, in a case where the melting point of the peripheral sealing material 5 is low, when the alloy containing barium and aluminum as the evaporable metal getter material 63 is heated, the peripheral sealing material 5 might melt, and therefore, the second gas adsorption material 62 (the evaporable metal getter material 63) cannot be disposed near the peripheral sealing material 5.

On this account, a glass frit higher in melting point than solder is preferable for the peripheral sealing material 5. The glass frit is a vitreous inorganic matter, its softening point can be set to a range from 300° C. to 950° C., and its composition can be selected depending on the purpose of use. Accordingly, even when the alloy containing barium and aluminum as the evaporable metal getter material 63 is heated to be activated, the glass frit as the peripheral sealing material 5 is hard to be melted. Accordingly, when the glass frit is used as the peripheral sealing material 5, the alloy containing barium and aluminum as the second gas adsorption material 62 (the evaporable metal getter material 63) can be disposed near the peripheral sealing material 5 that has a small influence on the appearance in the glass panel P.

Generally, the first gas adsorption material 61 is formed by pulverizing a zeolite-based nonmetal getter material. In the present embodiment, the first gas adsorption material 61 contains a zeolite-based nonmetal getter material having a porous structure, and an inorganic binder material connecting the nonmetal getter material, and therefore, the powdered nonmetal getter material in the first gas adsorption material 61 is stably held by the inorganic binder material. Hereby, it is not necessary to cover the nonmetal getter material in the first gas adsorption material 61 with a packaging material, and the glass panel P can stably secure the gas adsorption performance of the gas adsorption material 6 with a simple configuration. Here, if the binder material contained in the first gas adsorption material 61 is constituted by an organic material, gas is generated from the organic material at the time when the first gas adsorption material 61 is heated to its activation temperature. Accordingly, gas might remain in the gap V in the glass panel P, which might decrease the heat insulation performance. In the meantime, in the present embodiment, since the first gas adsorption material 61 contains the inorganic binder material, no gas is generated from the inorganic binder material even when the first gas adsorption material 61 is heated to its activation temperature. This makes it possible to maintain the heat insulation performance of the glass panel P.

In addition, in the present embodiment, the gas adsorption material 6 is disposed on the third surface 13 (an example of one surface) out of the pair of plate surfaces 12, 13 facing each other via the gap V in the pair of glass plates 1A, 1B such that the gas adsorption material 6 is apart from the second surface 12 (an example of the other surface). Accordingly, the gas adsorption material 6 can secure a large contact area with gas without decreasing the contact area with the gas by the second surface 12 (the other surface) of the glass plate 1A. As a result, the glass panel P can stably secure the gas adsorption performance of the gas adsorption material 6 with a simple configuration.

As illustrated in FIG. 3, in the glass panel P, the pair of glass plates 1A, 1B (only the second glass plate 1B is illustrated in FIG. 3) are formed into a rectangular shape. The pair of glass plates 1A, 1B have right and left long-side portions 3*a*, 3*b* extending in the up-down direction and upper and lower short-side portions 3*c*, 3*d* extending in the right-left direction. In the present embodiment, the first gas adsorption material 61 is disposed on the short-side portion 3*d* on the lower side of the glass panel P and is disposed in a linear shape along the third surface 13 (see FIG. 2) of the second glass plate 1B. Although not illustrated herein, the first gas adsorption material 61 may be disposed on the short-side portion 3*c* on the upper side of the glass panel P.

In a case where the pair of glass plates 1A, 1B are formed into a rectangular shape and have the long-side portions 3*a*, 3*b* and the short-side portions 3*c*, 3*d*, when the first gas adsorption material 61 is disposed on the long-side portion 3*a*, 3*b* or the short-side portion 3*c*, 3*d*, it is possible to restrain an influence on the appearance of the glass panel P. In the present embodiment, since the first gas adsorption material 61 is disposed on the short-side portion 3*d* (or 3*c*), it is possible to shorten the length of the first gas adsorption material 61 disposed in the pair of glass plates 1A, 1B. As a result, it is possible to further restrain the influence of the first gas adsorption material 61 on the appearance of the glass panel P.

Further, in the glass panel P, the first gas adsorption material 61, the second gas adsorption material 62, and the spacers 2 are disposed at different positions as viewed vertically to the place surfaces of the pair of glass plates 1A, 1B. Accordingly, the gas adsorption material 6 is disposed at a right position different from the spacers 2 in the depressurized gap V to secure its surface area. As a result, the glass panel P as a decompressed double-pane glass panel can stably secure the gas adsorption performance of the gas adsorption material 6 with a simple configuration.

Besides, when the first gas adsorption material 61 is disposed between the peripheral sealing material 5 and the spacer 2 like the present embodiment, the first gas adsorption material 61 can be disposed near the outer edges 3 of the glass panel P. Hereby, it is possible to restrain the influence of the gas adsorption material 6 on the appearance of the glass panel P.

If the first gas adsorption material 61 is disposed between a plurality of spacers 2, 2 adjacent to each other, it is necessary to increase the distance between the plurality of spacers 2, 2 adjacent to each other to correspond to the dimension of the first gas adsorption material 61, and this might decrease the holding strength of the pair of glass plates 1A, 1B in the glass panel P. In the meantime, when the first gas adsorption material 61 is disposed between the peripheral sealing material 5 and the spacer 2 like the present embodiment, the distance between the plurality of spacers 2, 2 adjacent to each other can be set uniform at a predetermined pitch Pd, so that the glass panel P can easily maintain the holding strength of the pair of glass plates 1A, 1B between the plurality of spacers 2, 2. Hereby, it is possible to restrain the decrease in the holding strength of the pair of glass plates 1A, 1B in the glass panel P.

It is preferable that the first gas adsorption material 61 be provided such that a distance D1 between the peripheral sealing material 5 and the spacer 2 is 40 mm or less and a distance D2 between the first gas adsorption material 61 and the peripheral sealing material 5 and a distance D3 between the first gas adsorption material 61 and the spacer 2 are 1 mm or more.

| When the distance D1 between the peripheral sealing material 5 and the spacer 2 in the glass panel P is too large, the holding strength of the pair of glass plates 1A, 1B decreases. When the distance D1 between the peripheral sealing material 5 and the spacer 2 between which the first gas adsorption material 61 is disposed is 40 mm or less, it is possible to restrain a decrease in the holding strength of the pair of glass plates 1A, 1B in the glass panel P. In addition, when the distance D2 between the first gas adsorption material 61 and the peripheral sealing material 5 and the distance D3 between the first gas adsorption material 61 and the spacer 2 are both 1 mm or more, the first gas adsorption material 61 can be disposed apart from the peripheral sealing material 5 and the spacer 2. This allows the first gas adsorption material 61 to secure a large contact area with gas on the surface thereof. As a result, the glass panel P can stably secure the gas adsorption performance of the first gas adsorption material 61.

It is preferable that the first gas adsorption material 61 be disposed in a linear shape along the plate surface as the third surface 13 with a width W (see FIG. 2) of 1 mm or more but 15 mm or less and a length L (see FIG. 3) of 1 mm or more but 2000 mm or less and with a height H (see FIG. 2) relative to the plate surface (the third surface 13) being 10 μm or more but 190 μm or less.

When the first gas adsorption material 61 is disposed in a linear shape along the plate surface as the third surface 13 of the second glass plate 1B and the width W and the length L of the first gas adsorption material 61 are within respective predetermined ranges, the first gas adsorption material 61 of the glass panel P can sufficiently exercise the gas adsorption performance and can restrain the influence on the appearance. When the width W is less than 1 mm, the first gas adsorption material 61 cannot sufficiently exercise the gas adsorption performance, but when the width W exceeds 15 mm, the first gas adsorption material 61 is excessively outstanding and impairs the appearance of the glass panel P. Also, when the length L of the first gas adsorption material 61 is less than 1 mm, the first gas adsorption material 61 cannot sufficiently exercise the gas adsorption performance, but when the length L exceeds 2000 mm, the first gas adsorption material 61 is excessively outstanding and impairs the appearance of the glass panel P. Furthermore, when the height H of the first gas adsorption material 61 relative to the plate surface (the third surface 13) is 10 μm or more but 190 μm or less, the first gas adsorption material 61 of the glass panel P can sufficiently exercise the gas adsorption performance and is hard to make contact with the second surface 12 of the first glass plate 1A, thereby making it possible to avoid such a situation that the first glass plate 1A is damaged due to contact with the high-hardness first gas adsorption material 61. In the meantime, when the height His less than 10 μm, the first gas adsorption material 61 cannot sufficiently exercise the gas adsorption performance, but when the height H exceeds 190 μm, the first gas adsorption material 61 easily comes into contact with the second surface 12 of the first glass plate 1A at the time when an impact or the like is applied to the first glass plate 1A. When the first gas adsorption material 61 makes contact with the second surface 12 of the first glass plate 1A, the first glass plate 1A might be damaged by the high-hardness first gas adsorption material 61. Meanwhile, when the height of the first gas adsorption material 61 exceeds 190 μm and the first gas adsorption material 61 comes into contact with both surfaces (the second surface 12 and the third surface 13) of the pair of glass plates 1A, 1B, the first gas adsorption material 61 causes heat transfer between the pair of glass plates 1A, 1B, so that the heat insulation performance of the glass panel P decreases.

Further, in the present embodiment, when the inorganic binder material contained in the first gas adsorption material 61 is made of a material having gas adsorption performance, gas absorption by the first gas adsorption material 61 in the gap V is further promoted by the inorganic binder material in the glass panel P. This decreases the thermal transmittance (U-value) of the gap V in the glass panel P, thereby making it possible to further improve heat insulating properties.

Further, in the present embodiment, the gas adsorption material 6 further contains the metal getter material 63 (the second gas adsorption material 62) in addition to the nonmetal getter material (the first gas adsorption material 61), and the metal getter material 63 (the second gas adsorption material 62) is disposed at a position different from the nonmetal getter material (the first gas adsorption material 61). Hereby, the gas adsorption material 6 can also adsorb gas by the metal getter material 63 (the second gas adsorption material 62). More specifically, the nonmetal getter material and the metal getter material 63 have different actions such that the nonmetal getter material adsorbs gas by physical adsorption in the short term, whereas the metal getter material 63 adsorbs gas by chemical adsorption in the long term. Since the gas adsorption material 6 includes the nonmetal getter material (the first gas adsorption material 61) and the metal getter material 63 (the second gas adsorption material 62) different in time to exercise gas adsorption performance, the gas adsorption material 6 can further improve the gas adsorption performance.

Note that the metal getter material (the second gas adsorption material 62) and the nonmetal getter material (the first gas adsorption material 61) may be disposed on the same plate surface (the second surface 12 or the third surface 13), or the nonmetal getter material may be disposed on one surface out of the second surface 12 and the third surface 13 and the metal getter material 63 may be disposed on the other surface out of the second surface 12 and the third surface 13, provided that the metal getter material (the second gas adsorption material 62) and the nonmetal getter material (the first gas adsorption material 61) are at different positions as viewed vertically relative to the plate surface (for example, the first surface 11) of the pair of glass plates 1A, 1B. As described above, since the second gas adsorption material 62 is constituted by the evaporable metal getter material 63, the evaporable metal getter material 63 sublimates in response to activation of the evaporable metal getter material 63 due to heating. When the metal getter material 63 adheres to the first gas adsorption material 61, the gas adsorption performance might decrease. However, when the first gas adsorption material 61 and the second gas adsorption material 62 are disposed at different positions, the gas adsorption performance of the first gas adsorption material 61 can be maintained.

In the present embodiment, since the metal getter material 63 constituting the second gas adsorption material 62 is an evaporable metal getter material, when the metal getter material 63 is heated and activated, the metal getter material 63 partially evaporates to detach adsorbed molecules, so that the adsorbed molecules disperse in the gap V. This allows the second gas adsorption material 62 to effectively adsorb gas in the gap V by the adsorbed molecules. As a result, it is possible to further improve the gas adsorption performance of the gas adsorption material 6 in the glass panel P.

Figure 4:
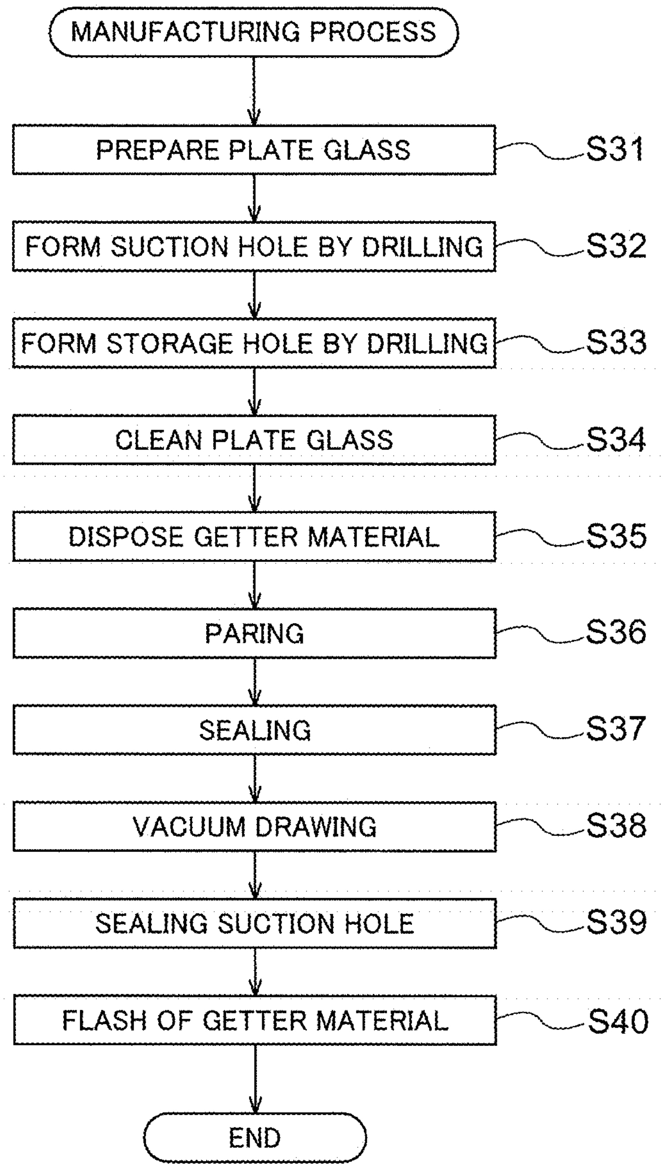
FIG. 4 is a flowchart illustrating a manufacturing method for manufacturing a double-pane glass panel.

The glass panel P is manufactured based on the flowchart illustrated in FIG. 4. First, two glass base plates (not illustrated) made of float glass and having a predetermined thickness are cut into a predetermined dimension, e.g., 1200 mm×900 mm to prepare the glass plates 1A, 1B having the same shape and the same size (step S31). Subsequently, the suction hole 4 is formed in the first glass plate 1A by drilling in the vicinity of any one of four corners by means of a drill or the like (step S32), and the storage hole 18 having a groove shape is formed by drilling in the second glass plate 1B, at a position facing the suction hole 4, by means of a drill or the like (step S33) (a drilling step).

Subsequently, the pair of glass plates 1A, 1B are cleaned by use of a liquid cleaning method in a space such as a clean room or a chemical clean room in which the contamination state of air is chemically or physically controllable (step S34) (a cleaning step). A cleaning fluid used in the liquid cleaning method contains alkali detergent or ozone water, for example. Further, the cleaning fluid contains abrasive. As the abrasive, fine particles mainly containing cerium oxide is used, for example.

Subsequently, the second glass plate 1B is supported generally horizontally, the spacers 2 are disposed at the constant pitch Pd, the evaporable metal getter material 63 is stored in the storage hole 18, and the first gas adsorption material 61 is applied to a predetermined portion of the second glass plate 1B (step S35) (a getter material disposition step). Then, the first glass plate 1A is placed on the second glass plate 1B from above, and the pair of glass plates 1A, 1B are paired (step S36). Note that the first gas adsorption material 61 is formed in a paste form such that a zeolite-based nonmetal getter material is pulverized, and kaolin, smectite, and water are added thereto.

Further, the pair of glass plates 1A, 1B thus paired are kept generally horizontal, and the outer peripheral edge portions of the pair of glass plates 1A, 1B are sealed by use of a glass frit having a softening point of 400° C. to 500° C. as the peripheral sealing material 5 (step S37) (a sealing step). Solder having a melting temperature equal to or less than 250° C. may be used as the peripheral sealing material 5. For example, solder having a composition of 91.2Sn-8.8Zn (eutectic point temperature: 198° C.), for example, may be used as the peripheral sealing material 5.

In a case where the peripheral sealing material 5 is a glass frit, the pair of glass plates 1A, 1B and the peripheral sealing material 5 are heated to about 400° C. and welded to each other. Hereby, the outer peripheral edge portions of the pair of glass plates 1A, 1B are sealed by the peripheral sealing material 5 (the glass frit).

In a case where the peripheral sealing material 5 is solder, a moving mechanism (not illustrated) is moved at a constant speed over a rail member (not illustrated) along a peripheral edge portion V1 of the gap V between the pair of glass plates 1A, 1B, and a guide plate (not illustrated) is inserted into the gap V from a groove portion 19 between the pair of glass plates 1A, 1B (see FIG. 1) in step S37. Hereby, the peripheral sealing material 5 enters the whole peripheral edge portion V1 between the pair of glass plates 1A, 1B via the guide plate, so that the peripheral edge portion V1 between the pair of glass plates 1A, 1B is airtightly sealed by the peripheral sealing material 5. Here, the groove portion 19 is a portion provided at a corner of the glass panel P and obtained by chamfering corners of the pair of glass plates 1A, 1*b* which corners face the gap V, so that the guide plate can be easily inserted into the gap V. Here, the pair of glass plates 1A, 1B and the peripheral sealing material 5 are heated to about 200° C. and welded to each other. Hereby, the outer peripheral edge portions of the pair of glass plates 1A, 1B are sealed by the peripheral sealing material 5 (solder).

Subsequently, in step S38, vacuum drawing to discharge gas in the gap V to outside is performed to decrease the pressure of the gap V to be equal to or less than 1.33 Pa. More specifically, in the vicinity of the suction hole 4, a gas-discharge cup is attached to the principal surface on the atmospheric air side of the first glass plate 1A to cover the suction hole 4, and gas in the gap V is sucked up by a rotary pump or a turbo-molecular pump (not illustrated) connected to the gas-discharge cup.

Note that the pump used in step S38 is not limited to the above-mentioned rotary pump or turbo-molecular pump, provided that the pump can be connected to the gas-discharge cup and can suck up the gas.

The activation of the first gas adsorption material 61 is performed before or after a decompression step or at the same time as the decompression step. For example, in a case where the peripheral sealing material 5 is a glass frit, the nonmetal getter material of the first gas adsorption material 61 is heated to about 400° C. to be activated after sealing is performed by the peripheral sealing material 5. In a case where the peripheral sealing material 5 is solder, the nonmetal getter material of the first gas adsorption material 61 is heated to about 200° C. to be activated after sealing is performed by the peripheral sealing material 5. Alternatively, the nonmetal getter material of the first gas adsorption material 61 may be activated while the gap Vis decompressed at a high temperature, or the nonmetal getter material of the first gas adsorption material 61 may be locally heated to be activated separately.

Then, the suction hole sealing material 15 for covering the suction hole 4 is dropped such that the suction hole sealing material 15 is bonded to the glass surface near the suction hole 4 to seal the suction hole 4 (step S39). In a case where the suction hole sealing material 15 is a glass frit, the suction hole sealing material 15 is heated to about 300° C. to seal the suction hole 4. In a case where the suction hole sealing material 15 is solder, the suction hole sealing material 15 is heated to about 200° C. to seal the suction hole 4. Hereby, the gap V formed between the pair of glass plates 1A, 1B is sealed.

Note that, among those steps, the steps from the step (step S34) of cleaning the principal surfaces of the pair of glass plates 1A, 1B to the step (step S39) of bonding the glass surface near the suction hole 4 to the suction hole sealing material 15 to seal the suction hole 4 are performed under the atmospheric air.

Subsequently, the evaporable metal getter material 63 stored in the storage hole 18 is locally heated by use of a high frequency device (not illustrated) (step S40). More specifically, the evaporable metal getter material 63 is maintained at 800° C. to 1200° C. for about 15 seconds to be activated (flashed), so that the metal getter material 63 is evaporated on an inner principal surface (the second surface 12) of the glass plate 1A. The metal getter material 63 adhering to the second surface 12 of the glass plate 1A comes into contact with various gas molecules scattered in the gap V and adsorbs and removes gas such as water, CO, $CO_2$, $N_2$, $H_2$, $O_2$, and the like constituted by the gas molecules, and hereby, the process is ended.

In the present embodiment, after the outer peripheral edge portions of the pair of glass plates 1A, 1B are sealed (step S37) and after the suction hole 4 is sealed (step S39), the evaporable metal getter material 63 is locally heated (step S40). Accordingly, the metal getter material 63 adhering to the second surface 12 of the glass plate 1A can adsorb gas molecules scattered in the gap V, thereby making it possible to maintain the decompression level of the gap V for a long time. In addition, even if the pair of glass plates 1A, 1B are insufficiently cleaned, gas molecules can be adsorbed, thereby making it possible to maintain the decompression level of the gap V for a long time. Besides, since the metal getter material 63 (the second gas adsorption material 62) and the nonmetal getter material (the first gas adsorption material 61) are at different positions, the first gas adsorption material 61 can effectively adsorb gas molecules of hydrocarbon gas ($CH_4$, $C_2H_6$, and the like) or ammonia gas ($NH_3$), which are hard to be adsorbed by the metal getter material 63.

The glass panel P can be used for various purposes of use such as window glass of a building, an automobile, a ship, or the like, a door, a wall, or the like of various devices such as a refrigerator or a thermostat.

Modification of First Embodiment

Figure 5:
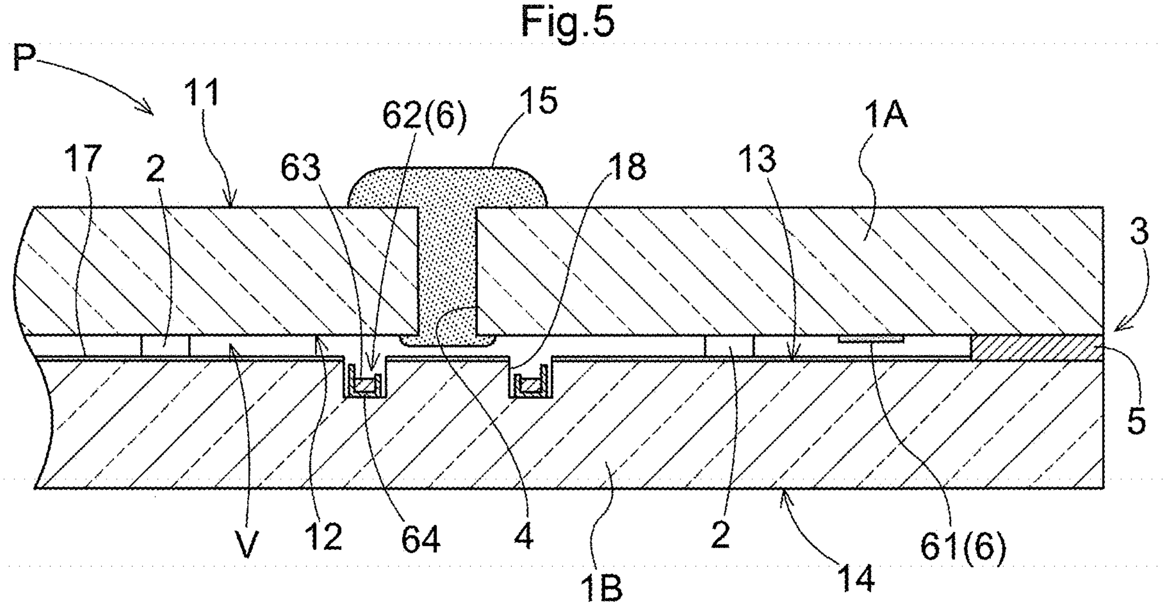
FIG. 5 is a drawing of longitudinal section around a suction hole in a modification of the first embodiment.

As illustrated in FIG. 5, the first gas adsorption material 61 may be disposed on the second surface 12 of the first glass plate 1A in the glass panel P. Even in this case, the first gas adsorption material 61 is applied to the second surface 12, so that pairing of the pair of glass plates 1A, 1B is easily performed.

Second Embodiment

Figure 6:
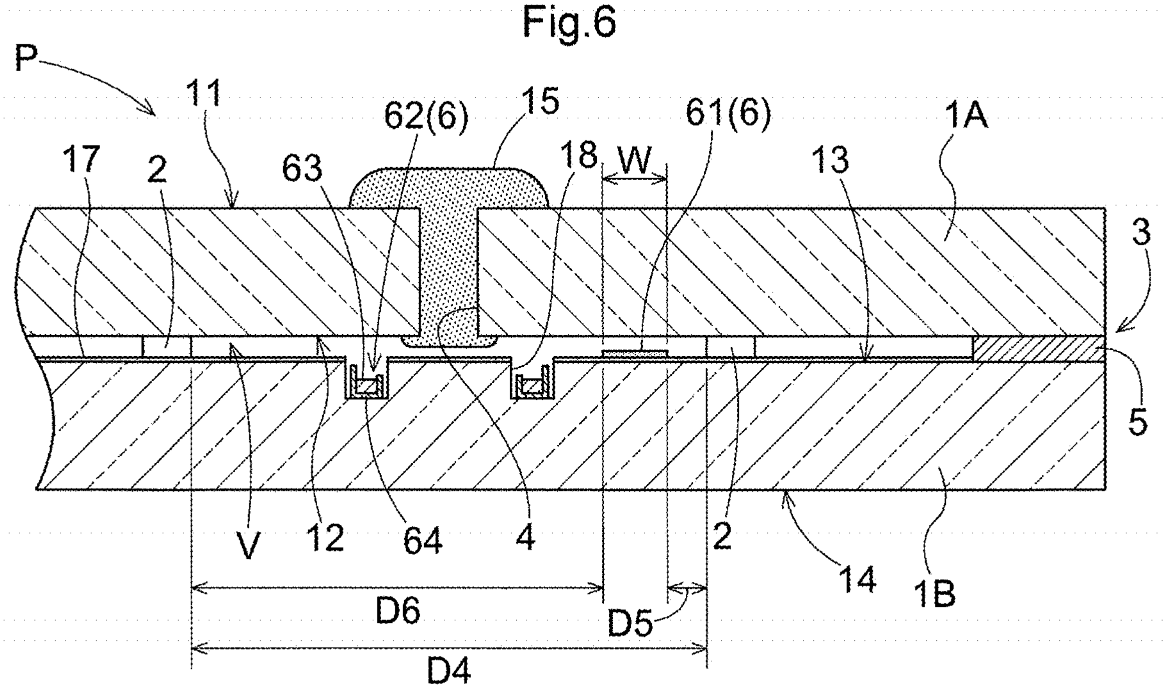
FIG. 6 is a drawing of longitudinal section around a suction hole of a double-pane glass panel in a second embodiment.

As illustrated in FIG. 6, in the glass panel P, the first gas adsorption material 61 may be disposed between a plurality of spacers 2, 2 adjacent to each other on the third surface 13 of the second glass plate 1B.

In the glass panel P including a plurality of spacers 2, in a case where the distance D1 (see FIG. 2) between the peripheral sealing material 5 and the spacer 2 adjacent to the peripheral sealing material 5 is smaller than the width W of the first gas adsorption material 61, the first gas adsorption material 61 cannot be disposed therebetween. In such a case, when the first gas adsorption material 61 is disposed between the plurality of spacers 2 adjacent to each other like the second embodiment, the first gas adsorption material 61 can be surely disposed in the glass panel P. When the first gas adsorption material 61 is disposed between a spacer 2 adjacent to the peripheral sealing material 5 and a spacer 2 adjacent to the above spacer 2, for example, the first gas adsorption material 61 can be disposed near the outer edges 3 of the pair of glass plates 1A, 1B. Hereby, it is possible to restrain the influence of the first gas adsorption material 61 on the appearance of the glass panel P.

It is preferable to provide the first gas adsorption material 61 such that a distance D4 (generally the same as the pitch Pd) between the plurality of spacers 2, 2 adjacent to each other is 40 mm or less, and distances D5 and D6 from the first gas adsorption material 61 to the plurality of spacers 2, 2 adjacent to each other are 1 mm or more.

When the distance D4 between the plurality of spacers 2, 2 adjacent to each other in the glass panel P is too large, the holding strength of the pair of glass plates 1A, 1B in the glass panel P decreases. When the distance D4 between the plurality of spacers 2, 2 adjacent to each other is 40 mm or less, it is possible to restrain the decrease in the holding strength of the pair of glass plates 1A, 1B in the glass panel P. Further, when the distances D5 and D6 from the first gas adsorption material 61 to the plurality of spacers 2, 2 adjacent to each other are 1 mm or more, the first gas adsorption material 61 can be disposed apart from the plurality of spacers 2, 2 adjacent to each other. This allows the first gas adsorption material 61 to secure a large contact area with gas on the surface thereof. As a result, the glass panel P can stably secure the gas adsorption performance of the first gas adsorption material 61.

Modification of Second Embodiment

Figure 7:
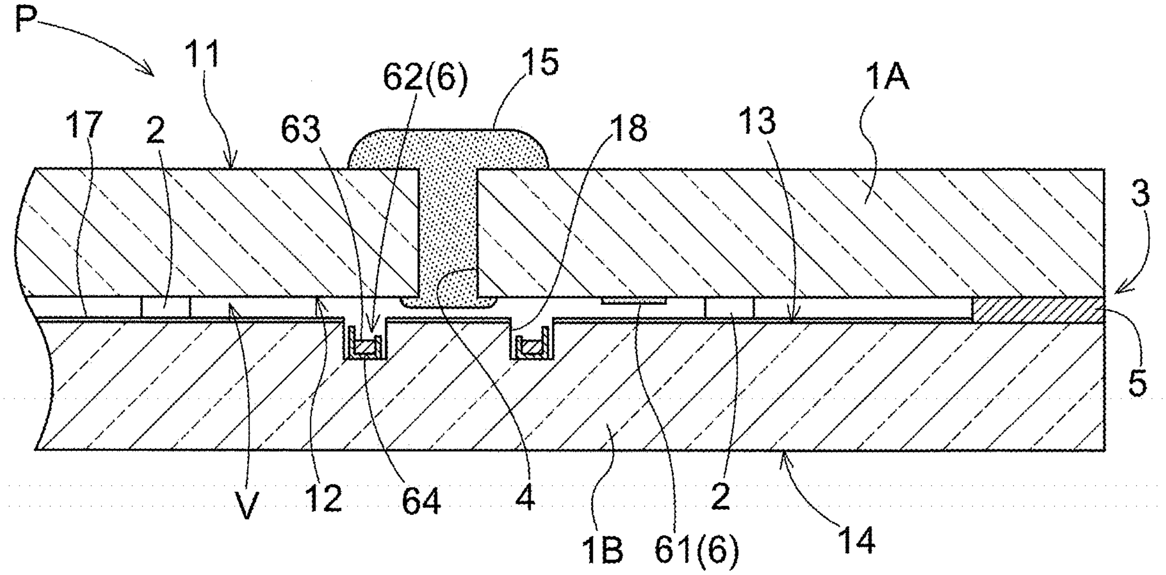
FIG. 7 is a drawing of longitudinal section around a suction hole in a modification of the second embodiment.

As illustrated in FIG. 7, the first gas adsorption material 61 may be disposed on the second surface 12 of the first glass plate 1A in the glass panel P. Even in this case, the first gas adsorption material 61 is applied to the second surface 12, so that pairing of the pair of glass plates 1A, 1B is easily performed.

Test Examples

Figure 8:
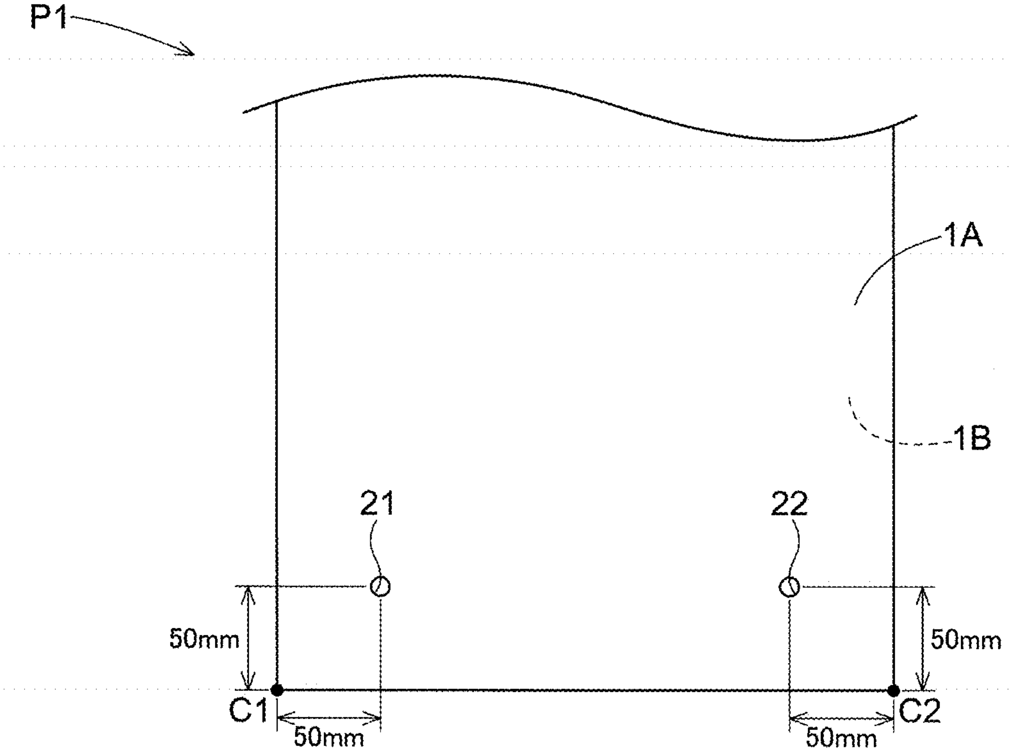
FIG. 8 is an explanatory view of a glass panel in a test model.

FIG. 8 illustrates a glass panel P1 to be used in Test 1 and Test 2. The glass panel P1 is float glass which includes the pair of glass plates 1A, 1B each having a square shape of 300 mm square and which has a plate thickness of 3.1 mm. The spacer 2 disposed between the pair of glass plates 1A, 1B is 0.5 mm in diameter and 0.2 mm in height, and the pitch Pd between a plurality of spacers 2 is set to 40 mm. The first glass plate 1A has the suction hole 4, and the third surface 13 of the second glass plate 1B has a first storage hole 21 for storing the metal getter material 63 and a second storage hole 22 for storing the nonmetal getter material. The first storage hole 21 is a bottomed cylindrical hole formed at a position distanced upward and rightward from a left lower corner C1 of the second glass plate 1B by 50 mm. The second storage hole 22 is a bottomed cylindrical hole formed at a position distanced upward and leftward from a right lower corner C2 of the second glass plate 1B by 50 mm. The first storage hole 21 and the second storage hole 22 are both 6 mm in diameter and 1 mm in depth.

The peripheral sealing material 5 sealing the peripheral edge of the glass panel P1 and the suction hole sealing material 15 sealing the suction hole 4 are made of "solder" of Sn—Zn alloy and have a melting point of 200° C., a density of 0.0073 (g/mm$^3$), and a specific heat of 243000 (J/g·K). A peripheral seal temperature, a vacuum evacuation temperature, and a suction hole sealing temperature are 200° C. or less.

[Test 1]

A glass panel of sample 1 was configured such that 5 mg of evaporable barium-aluminum (Ba—Al) alloy was stored as the metal getter material in the first storage hole 21, and no second storage hole 22 (no nonmetal getter material) was provided. A glass panel of sample 2 had the configuration of the first storage hole 21 of sample 1, and 1 mg to 20 mg of pellet-shaped zeolite was stored as the nonmetal getter material in the second storage hole 22. A glass panel of sample 3 had the configuration of the first storage hole 21 of sample 1, and a pasty getter material formed by mixing kaolin as an inorganic binder material with zeolite was stored in the second storage hole 22. In a case where kaolin (the inorganic binder material) is mixed with zeolite (the nonmetal getter material), when the blend ratio of them with water is set to zeolite 10:kaolin 1:water 16 to 18, the getter material can be formed in a paste form applicable to the plate surface of the glass panel. Accordingly, the glass panel of sample 3 contained kaolin by 0.1 mg to 2 mg. Sample 4 had the configuration of the first storage hole 21 of sample 1, and only kaolin was stored in the second storage hole 22. The glass panel of sample 4 contained kaolin by 1 mg to 20 mg.

Figure 9:
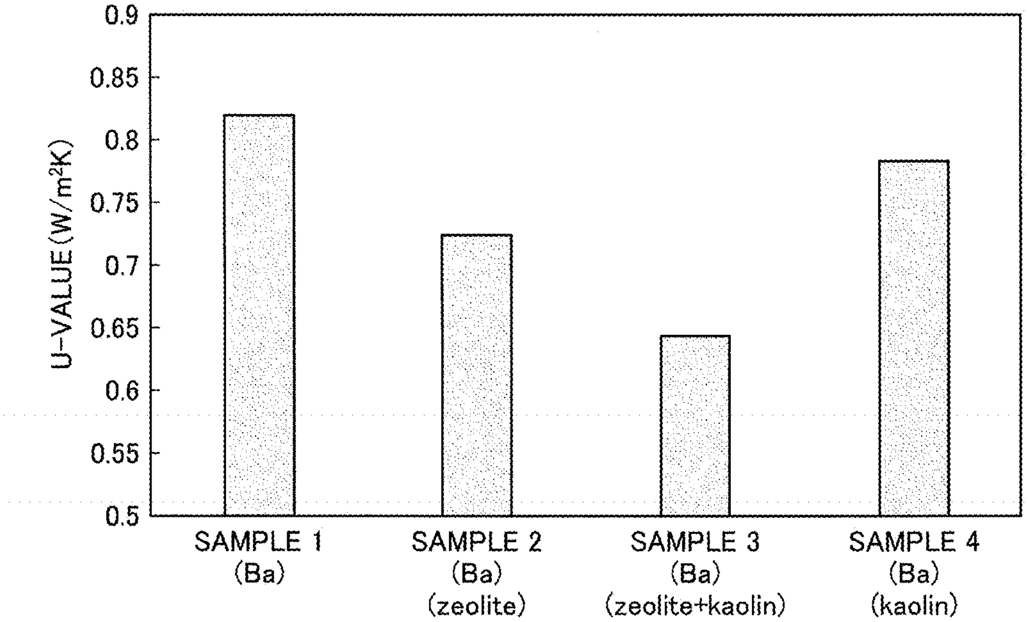
FIG. 9 is a graph (U-value evaluation) illustrating the result of Test 1.

The thermal transmittance (U-value) of each of samples 1 to 4 was measured. Test results of Test 1 are illustrated in FIG. 9. Note that, in FIG. 9, in samples 1 to 4, barium-aluminum (Ba—Al) alloy was abbreviated to "Ba."

[Result of Test 1]

As illustrated in FIG. 9, the U-value in sample 1 was about 0.82 (W/m$^2$K), the U-value in sample 2 was about 0.72 (W/m$^2$K), the U-value in sample 3 was about 0.64 (W/m$^2$K), and the U-value in sample 4 was about 0.78 (W/m$^2$K). From the above results, it was demonstrated that the glass panel in sample 3 containing the gas adsorption material obtained by mixing the inorganic binder materials (kaolin) with the nonmetal getter material (zeolite) had the lowest U-value. From them, it is found that the gas adsorption performance improves when the first gas adsorption material 61 further contains the inorganic binder material in addition to the nonmetal getter material.

[Test 2]

Figure 10:
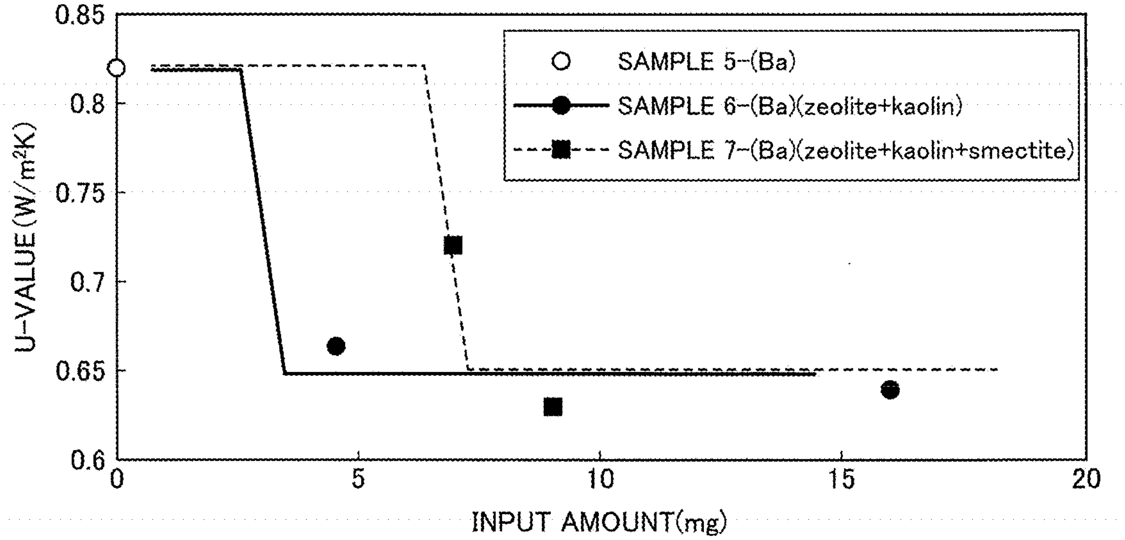
FIG. 10 is a graph (U-value evaluation) illustrating the result of Test 2.

Sample 5 corresponds to sample 1, and sample 6 corresponds to sample 3. Sample 7 was obtained by further adding smectite as a dispersing agent to pasty zeolite and kaolin in sample 3. Respective thermal transmittances (U-value) of samples 6 and 7 were measured by varying the total input amount of zeolite, kaolin, and smectite. Test results of Test 2 are illustrated in FIG. 10. Note that, in FIG. 10, in samples 5 to 7, barium-aluminum (Ba—Al) alloy was abbreviated to "Ba."

In a case where kaolin (an inorganic binder material) and smectite (a dispersing agent) are mixed with zeolite (a nonmetal getter material), when the blend ratio of them with water is set to zeolite 10:kaolin 1:smectite 1:water 16 to 18, a past form applicable to the plate surface of the glass panel P can be achieved. In sample 6, the total input amount of zeolite and kaolin was set to 4 mg and 16 mg, and the blend ratio of them was set to zeolite 10:kaolin 1. Based on the blend ratio, in the case of the total input amount of 4 mg, zeolite is 3.63 mg (4 mg×10/11), and kaolin is 0.37 mg (4 mg×1/11). Meanwhile, in the case of the total input amount of 16 mg, zeolite is 14.54 mg (16 mg×10/11), and kaolin is 1.46 mg (16 mg×1/11).

In sample 7, the total input amount of zeolite, kaolin, and smectite was set to 7 mg and 9 mg, and the blend ratio of them was zeolite 10:kaolin 1:smectite 1. Based on the blend ratio, in the case of the total input amount of 7 mg, zeolite is 5.64 mg (7 mg×10/12), kaolin is 0.58 mg (7 mg×1/12), and smectite is 0.58 mg (7 mg×1/12). Further, in the case of the total input amount of 9 mg, zeolite is 7.50 mg (9 mg×10/12), kaolin is 0.75 mg (9 mg×1/12), and smectite is 0.75 mg (9 mg×1/12).

[Results of Test 2]

As illustrated in FIG. 10, in sample 6, when zeolite and kaolin were input by 4 mg in total, the U-value greatly dropped from about 0.82 (W/m$^2$K) as an initial value (the glass panel in sample 5) to about 0.66 (W/m$^2$K). In sample 6, when the total input amount of zeolite and kaolin was increased to 16 mg, the U-value became about 0.64 (W/m$^2$K), and the U-value dropped moderately. In sample 7, when zeolite, kaolin, and smectite were input by 7 mg in total, the U-value greatly dropped from about 0.82 as an initial value (the glass panel in sample 5) to about 0.72 (W/m$^2$K). In sample 7, when the total input amount of zeolite, kaolin, and smectite was increased to 9 mg, the U-value dropped to about 0.63 (W/m$^2$K). From the above results, it was demonstrated that the U-value was lowest in the glass panel in sample 6 including a gas adsorption material obtained by mixing a predetermined amount of the inorganic binder material (kaolin) with the nonmetal getter material (zeolite) and the glass panel in sample 7 including a gas adsorption material obtained by mixing a predetermined amount of the inorganic binder material (kaolin) and the dispersing agent (smectite) with the nonmetal getter material (zeolite). Sample 7 requires a slightly larger amount of coating than sample 6, but the handling of the first gas adsorption material 61 in sample 7 is made easier due to the dispersing agent.

OTHER EMBODIMENTS (1) The above embodiment deals with an example in which the first gas adsorption material 61 is disposed in a linear shape along the plate surface as one surface (the second surface 12 or the third surface 13) between the pair of glass plates 1A, 1B, but the first gas adsorption material 61 has a shape such as a circular shape or a square shape, other than the linear shape. Further, the above embodiment deals with an example in which the first gas adsorption material 61 is disposed in a single continuous region on one surface (the second surface 12 or the third surface 13) between the pair of glass plates 1A, 1B, but the first gas adsorption material 61 may be disposed dispersedly in a plurality of regions on one surface (the second surface 12 or the third surface 13).

(2) The above embodiment deals with an example in which the first gas adsorption material 61 is disposed on the short-side portion 3*c*, 3*d* of the glass panel P having a rectangular shape, but the first gas adsorption material 61 may be disposed on the long-side portion 3*a*, 3*b* of the glass panel P having a rectangular shape.

(3) The above embodiment deals with an example in which the evaporable metal getter material 63 is used as the second gas adsorption material 62, but the second gas adsorption material 62 is not limited to this, and a non-evaporable metal getter material 63 that adsorbs and removes gas molecules in response to heating and activation may be used. A non-evaporable metal getter material and an evaporable metal getter material may be used together as the second gas adsorption material 62, and the second gas adsorption material 62 (the metal getter material 63 and the storage hole 18) may be disposed in a plurality of portions of the glass panel P. A plurality of second gas adsorption materials 62 may be disposed on either or both of the second surface 12 and the third surface 13 between the pair of glass plates 1A, 1B.

(4) The above embodiment deals with an example in which the Low-E film 17 is formed on the third surface 13 of the second glass plate 1B in the glass panel P, but the Low-E film 17 may be formed on the second surface 12 of the first glass plate 1A.

INDUSTRIAL APPLICABILITY

The present invention is widely applicable to a double-pane glass panel.

DESCRIPTION OF REFERENCE NUMERALS

1A: first glass plate
1B: second glass plate
2: spacer (spacing member)
3: outer edge
3*a*, 3*b*: long-side portion
3*c*, 3*d*: short-side portion
4: suction hole
5: peripheral sealing material
6: gas adsorption material
11: first surface
12: second surface
13: third surface
14: fourth surface
15: suction hole sealing material
18: storage hole
61: first gas adsorption material
62: second gas adsorption material
63: metal getter material
64: circular container
H: height of first gas adsorption material
L: length of first gas adsorption material
P: glass panel (double-pane glass panel)
V: gap
W: width of first gas adsorption material

The invention claimed is:

1. A double-pane glass panel, comprising:

a pair of glass plates facing each other;

a peripheral sealing material provided over whole outer edges of the pair of glass plates to form a gap sealed between the pair of glass plates;

a plurality of spacing members disposed in the gap;

a gas adsorption material disposed on one surface out of a pair of plate surfaces facing each other via the gap between the pair of glass plates, the gas adsorption material being apart from the other surface out of the pair of plate surfaces; and a suction hole sealing material sealing a suction hole formed from a front side to a back side of either one of the glass plates, in such a manner as to decompress the gap via the suction hole, wherein the gas adsorption material includes a zeolite-based nonmetal getter material having a porous structure, an inorganic binder material connecting the nonmetal getter material, and a metal getter material, and the metal getter material is disposed at a position facing the suction hole.

2. The double-pane glass panel according to claim 1, wherein the gas adsorption material and the spacing members are disposed at different positions as viewed vertically to the plate surfaces.

3. The double-pane glass panel according to claim 1, wherein the gas adsorption material is disposed between the peripheral sealing material and the spacing members.

4. The double-pane glass panel according to claim 1, wherein the gas adsorption material is disposed between spacing members adjacent to each other among the plurality of spacing members.

5. The double-pane glass panel according to claim 3, wherein the gas adsorption material is disposed such that a distance from the peripheral sealing material to the spacing members is 40 mm or less, and a distance from the gas adsorption material to the peripheral sealing material and a distance from the gas adsorption material to the spacing members are 1 mm or more.

6. The double-pane glass panel according to claim 4, wherein the gas adsorption material is disposed such that a distance between the spacing members adjacent to each other is 40 mm or less, and a distance from the gas adsorption material to each of the spacing members adjacent to each other is 1 mm or more.

7. The double-pane glass panel according to claim 1, wherein the gas adsorption material is disposed in a linear shape along the plate surface as the one surface, and the gas adsorption material is 1 mm or more but 15 mm or less in width, is 1 mm or more but 2000 mm or less in length, and is 10 μm or more but 190 μm or less in height relative to the plate surface.

8. The double-pane glass panel according to claim 1, wherein the inorganic binder material is made of a material having gas adsorption performance.

9. The double-pane glass panel according to claim 1, wherein the gas adsorption material is disposed in a single continuous region on the one surface.

10. The double-pane glass panel according to claim 1, wherein the pair of glass plates are formed into a rectangular shape having a long-side portion and a short-side portion, and the gas adsorption material is disposed in the short-side portion.

11. The double-pane glass panel according to claim 1, wherein the inorganic binder material contains a dispersing agent.

12. The double-pane glass panel according to claim 1, wherein the metal getter material and the nonmetal getter material are disposed at different positions as viewed vertically to the plate surfaces.

13. The double-pane glass panel according to claim 12, wherein the metal getter material is an evaporable metal getter material.

14. The double-pane glass panel according to claim 13, wherein the evaporable metal getter material is made of alloy containing barium and aluminum, and the peripheral sealing material is a glass frit.

* * * * *